United States Patent
Notagashira

(10) Patent No.: US 7,423,684 B2
(45) Date of Patent: Sep. 9, 2008

(54) IMAGE PICKUP APPARATUS AND IMAGE PICKUP SYSTEM

(75) Inventor: Hidefumi Notagashira, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 541 days.

(21) Appl. No.: 11/290,288

(22) Filed: Nov. 29, 2005

(65) Prior Publication Data

US 2006/0125949 A1 Jun. 15, 2006

(30) Foreign Application Priority Data

Dec. 10, 2004 (JP) .............................. 2004-358360

(51) Int. Cl.
 H04N 5/225 (2006.01)
(52) U.S. Cl. ...................... 348/342; 348/361
(58) Field of Classification Search ................ 348/236, 348/238, 335, 340, 342, 360, 361; 329/353, 329/885, 889
See application file for complete search history.

(56) References Cited

U.S. PATENT DOCUMENTS

| 4,437,111 | A | * | 3/1984 | Inai et al. ..................... 348/342 |
| 4,862,253 | A | * | 8/1989 | English et al. .............. 348/269 |
| 5,172,220 | A | * | 12/1992 | Beis ............................ 348/262 |
| 7,239,344 | B1 | * | 7/2007 | Ikoma et al. ............. 348/216.1 |
| 2003/0016290 | A1 | * | 1/2003 | Kwon ...................... 348/216.1 |
| 2003/0142221 | A1 | | 7/2003 | Takakuwa |
| 2005/0141117 | A1 | * | 6/2005 | Kim et al. ................... 359/892 |

FOREIGN PATENT DOCUMENTS

| JP | 04115661 | A | * | 4/1992 |
| JP | 05292388 | A | * | 11/1993 |
| JP | 07219076 | A | * | 8/1995 |
| JP | 7-284111 | A | | 10/1995 |
| JP | 11338028 | A | * | 12/1999 |
| JP | 2000224469 | A | * | 8/2000 |
| JP | 2001-45512 | A | | 2/2001 |
| JP | 2002135788 | A | * | 5/2002 |
| JP | 2003-219254 | A | | 7/2003 |
| JP | 2003324748 | A | * | 11/2003 |
| JP | 2004343614 | A | * | 12/2004 |

* cited by examiner

Primary Examiner—Lin Ye
Assistant Examiner—Jason Whipkey
(74) Attorney, Agent, or Firm—Canon U.S.A., Inc., IP Division

(57) ABSTRACT

At least one exemplary embodiment is directed to an image pickup apparatus configured to switch between a color and a black & white photographing modes, which includes an image pickup optical system, an image pickup element that receives a light through the image pickup optical system and opto-electronically converts the received light, a first luminance detecting unit that detects a luminance of a photographed object based on a signal from the image pickup element, a second luminance detecting unit that detects the luminance of the photographed object by receiving a light without intervention of the image pickup optical system, and a filter converting mechanism for interposing any one of a infrared cutoff filter and an optical element in an optical path of the image pickup optical system.

11 Claims, 2 Drawing Sheets

IMAGE PICKUP APPARATUS AND IMAGE PICKUP SYSTEM

BACKGROUND OF THE INVENTION

1. Field of the Invention

The present invention relates to an image pickup apparatus, more particularly, although not exclusively, to an image pickup apparatus configured to switch photographing between a color-photographing mode and a black and white ("black & white") photographing mode.

2. Description of the Related Art

Japanese Unexamined Patent Publication No. 2001-45512 discusses a conventional image pickup apparatus capable of switching the photographing modes from the color photographing mode to the black & white photographing mode and vice versa. This type of conventional image pickup apparatus uses CCDs as image pickup elements, and during the color photographing mode, an infrared ray cutoff filter is disposed in front of the CCDs, in order to improve the reproducability of the color in the visible rays band. Further, during the black & white photographing mode, such a configuration is used in which an infrared ray cutoff filter is removed so as to increase the quantity of light. In the described image pickup apparatus, a so-called hunting operation is reduced, which is the repeatedly switching of the image mode between the color and the black & white photographing modes. This configuration sets a plurality of threshold values of luminescence level at the time when the color photographing mode is changed over to the black & white photographing mode and also at the time when the black & white photographing mode is changed over to the color photographing mode.

With the configuration as discussed in the Japanese Unexamined Patent Publication No. 2001-45512, it is difficult to set the threshold value for the luminescence level during the black & white photographing mode for the reason that there are many different cases where the photography is carried out under the sun light, under the lightening by an incandescent lamp or a fluorescent lamp, or under the lightening by the infrared ray. Hence, problems occur in which the hunting cannot be completely prevented and the smooth switching, from the black & white photographing mode to the color photographing mode, may be reduced.

In order to address the above-mentioned problem, Japanese Unexamined Patent Publication No. 2003-219254 discusses a configuration such that switching from the black & white photographing mode to the color photographing mode is executed by taking into consideration color signals in addition to luminance signals of CCDs.

In the configuration adopted by the Japanese Unexamined Patent Publication No. 2003-219254, during the black & white photographing mode, monitoring as to whether or not the gains of respective color signals of the CCDs are equal to one another is performed to determine whether or not an increase in the luminescence level due to the infrared ray occurs. Thus, when photography is performed at a site where the wall face thereof and/or the floor face thereof is covered with a relatively lot of mono-tone color such as a green or a blue, under the lighting of the incandescent lamp, the gains of respective color signals of the CCDs become equal to each other, and as a result, the lighting is determined such that there is an occurrence of an increase in the luminescence level due to the infrared ray lighting. Accordingly, even if there is a lot of visible light, enough for implementing the color photography, the switching from the black & white photographing mode to the color photographing mode does not easily occur.

Further, Japanese Unexamined Patent Publication No. 07-284111 discusses a configuration such that an infrared ray cutoff filter is disposed in front of CCDs during the color photographing mode and a visible light cut-off filter is instead disposed during the black & white photographing mode. In this configuration, image signals from the CCDs are compared with outputs from light-receiving elements directly receiving light reflected from a photographed object to execute switching of the photographing modes between the color photographing mode to the black & white photographing mode and vice versa. At this time, in order to compensate for a differential between the focal point of the visible light and that of the infrared ray, a lens driving device is employed for adjustably moving a focussing lens along an optical axis.

In the configuration of Japanese Unexamined Patent Publication No. 07-284111, the visible light is cut by the visible light cutoff filter at the time of black & white photographing mode. Therefore, this configuration is inexpedient from the viewpoint of effective use of any quantity of light and moreover, it suffers in that a lens moving mechanism is used for the focussing lens that adjustably compensates for the focal point difference between the visible light and the infrared ray according to the switching of the photographing mode from the color to black & white photographing mode and vice versa, resulting in the entire apparatus and system becoming more complicated.

SUMMARY OF THE INVENTION

At least one exemplary embodiment is directed to an apparatus and a system, which are configured to switch the photographing mode smoothly while reducing generation of hunting in a motion to switch the photographing mode. For example, at least one exemplary embodiment is directed to an image pickup apparatus (e.g., adapted for being used as a monitoring camera) configured to switch between a color-photographing mode and a black and white photographing mode.

At least one exemplary embodiment is directed to an image picking-up system including a plurality of image pickup apparatuses and a control unit for individually controlling the respective image pickup apparatuses.

At least one further exemplary embodiment is directed to an image pickup apparatus is configured to switch between a color photographing mode and a black & white photographing mode, which includes an image pickup optical system, an image pickup element that receives a light through the image pickup optical system and opt-electronically converts the received light. The image pickup apparatus further includes a first luminance detecting device configured to detect a luminance of a photographed object based on a signal from the image pickup element, a second luminance detecting device configured to detect the luminance of the photographed object by receiving a light without intervention of the image pickup optical system, and a filter converting device for interposing any one of a infrared cutoff filter and an optical element in an optical path of the image pickup optical system based on a detected result of at least one of the first and second luminance detecting devices. The image pickup element is disposed at a position located within a focal depth defined in a case where the infrared cutoff filter is interposed in the optical path of the image pickup optical system, and is also disposed at a position located within a focal depth defined in a case where the optical element is interposed in the optical path of the image pickup optical system.

At least one further exemplary embodiment is directed to an image pickup apparatus capable of switching photographing modes between a color photographing mode and a black & white photographing mode. The image pickup apparatus further includes an image pickup optical system, an image pickup element that receives a light through the image pickup optical system and opt-electronically converts the received light. Additionally the image pickup apparatus includes a first luminance detecting device configured to detect a luminance of a photographed object based on a signal from the image pickup element, a second luminance detecting device configured to detect the luminance of the photographed object by receiving a light without intervention of the image pickup optical system. Additionally included is a filter converting device for interposing any one of a infrared cutoff filter and an optical element in an optical path of the image pickup optical system based on a detected result of at least one of the first and second luminance detecting devices, where either a shape or a material of the infrared cutoff filter is designed in a manner such that the image pickup element is disposed at a position located within a focal depth defined in a case where the infrared cutoff filter is interposed in the optical path of the image pickup optical system.

At least one further exemplary embodiment is directed to an image pickup apparatus capable of switching photographing modes between a color photographing mode and a black & white photographing mode, which includes an image pickup optical system, an image pickup element that receives a light through the image pickup optical system and opt-electronically converts the received light. The image pickup apparatus further includes a first luminance detecting device configured to detect a luminance of a photographed object based on a signal from the image pickup element, a second luminance detecting device configured to detect the luminance of the said photographed object by receiving a light without intervention of the image pickup optical system, and a filter converting device for interposing any one of a infrared cutoff filter and an optical element in an optical path of the image pickup optical system based on a detected result of at least one of the first and second luminance detecting devices. A shape and a material of the optical element can be designed in a manner such that the image pickup element is disposed at a position located within a focal depth defined in a case where the optical element is interposed in the optical path of the image pickup optical system.

The above and further features of the present invention will become apparent from the following description of exemplary embodiments with reference to the attached drawings.

DESCRIPTION OF THE EMBODIMENTS

Figure 1:
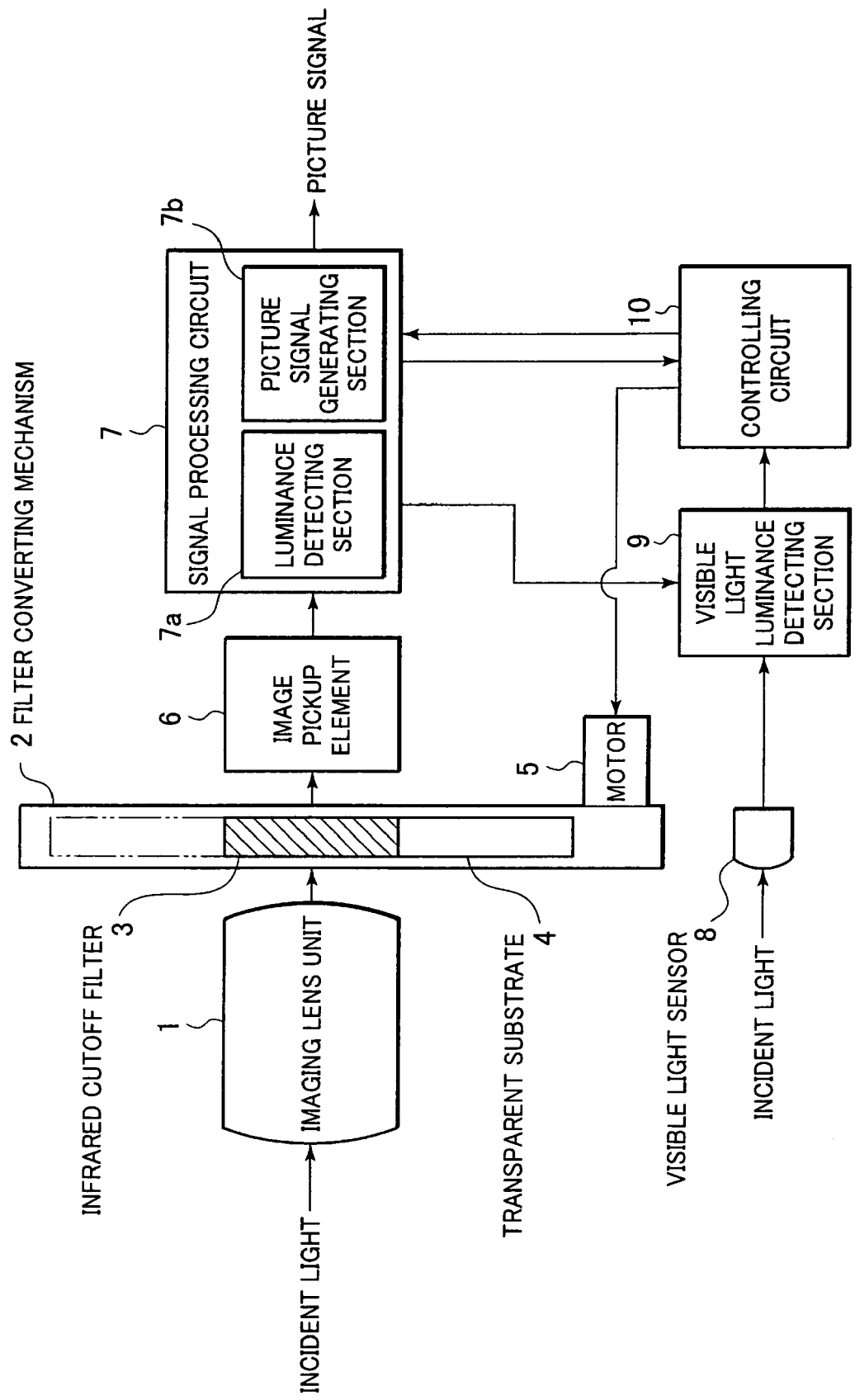
FIG. 1 illustrates a block diagram of an image pickup apparatus according to an exemplary embodiment; and, FIG. 2 is a control flow chart illustrating the controlling process to switch a photography mode, according to an exemplary embodiment.

The following description of exemplary embodiment(s) is merely illustrative in nature and is in no way intended to limit the invention, its application, or uses.

Exemplary embodiments can be used with various image capturing devices (e.g., electronic cameras, camcorders, digital still cameras, film cameras, broadcast cameras, video cameras, other imaging devices as known by one of ordinary skill, and equivalents) forming imaging systems.

Processes, techniques, apparatus, and materials as known by one of ordinary skill in the art may not be discussed in detail but are intended to be part of the enabling description where appropriate. For example, a signal processing circuit and the controlling circuit are discussed. The details of these circuits not discussed, and as known by one of ordinary skill in the relevant art is intended to be part of the enabling discussion and included within the scope of exemplary embodiments.

Additionally exemplary embodiments are not limited to visual imaging devices (e.g., optical photographic systems), for example, the system can be designed for use with infrared and other wavelength imaging systems. Additionally, exemplary embodiments can be used with non-digital systems as well as digital systems (e.g., photographic systems using CCDs).

Notice that similar reference numerals and letters refer to similar items in the following figures, and thus once an item is defined in one figure, it may not be discussed or further defined in the following figures.

The description of exemplary embodiments will be provided hereinbelow with reference to the accompanying drawings.

FIG. 1 illustrates a block diagram of an image pickup apparatus according to at least one exemplary embodiment. In FIG. 1, reference numeral 1 denotes an imaging lens unit (e.g., an image pickup optical system). Reference numeral 2 denotes a filter converting mechanism, which can have an infrared cutoff filter 3 and a transparent substrate (an optical element) 4. The infrared cutoff filter 3 and transparent substrate (optical element) 4 are configured and arranged to be appropriately moved by a motor 5 in a direction substantially perpendicular to an optical axis of the imaging lens unit 1, so that they are convertibly interposed onto the optical axis of the imaging lens unit 1. Further, the infrared cutoff filter 3 and transparent substrate 4 are disposed to be convertibly interposed behind the imaging lens unit 1. However, alternatively, such a configuration may be adopted that interposition of these two elements may be taken place at either a position in front of the imaging lens unit 1 or a position located in the interior of the imaging lens unit 1.

In FIG. 1, reference numeral 6 denotes an image pickup element, and numeral 7 denotes a signal processing circuit including therein a luminance detecting section (i.e., a first luminance detecting unit) 7a and a picture signal generating section 7b. An incident light, contributing to an imaging operation, comes to be incident on the imaging lens unit 1, and thereafter passes through either the infrared cutoff filter 3 or transparent substrate 4 to be subsequently incident on the image pickup element 6. The light incident on the image pickup element 6 comes into the signal processing circuit 7 where it is subjected to signal processing, and subsequently outputted as either a color signal or a black & white signal (i.e., picture signals).

Further, reference numeral 8 denotes a visible light sensor (i.e., a second luminance detecting unit), which is arranged to be separate from the imaging lens unit 1, and numeral 9 denotes a visible light luminance detecting section. Furthermore, reference numeral 10 denotes a controlling circuit.

With the above-described configuration, at the time of color photographing mode, the infrared cutoff filter 3 is brought to be interposed between the imaging lens unit 1 and image pickup element 6, and a color signal is output as a picture signal by the signal processing circuit 7. On the contrary, during the time of the black & white photographing mode, the transparent substrate 4 is brought to be interposed between the imaging lens unit 1 and image pickup element 6, and a black & white signal is output as a picture signal by the signal processing circuit 7.

Figure 2:
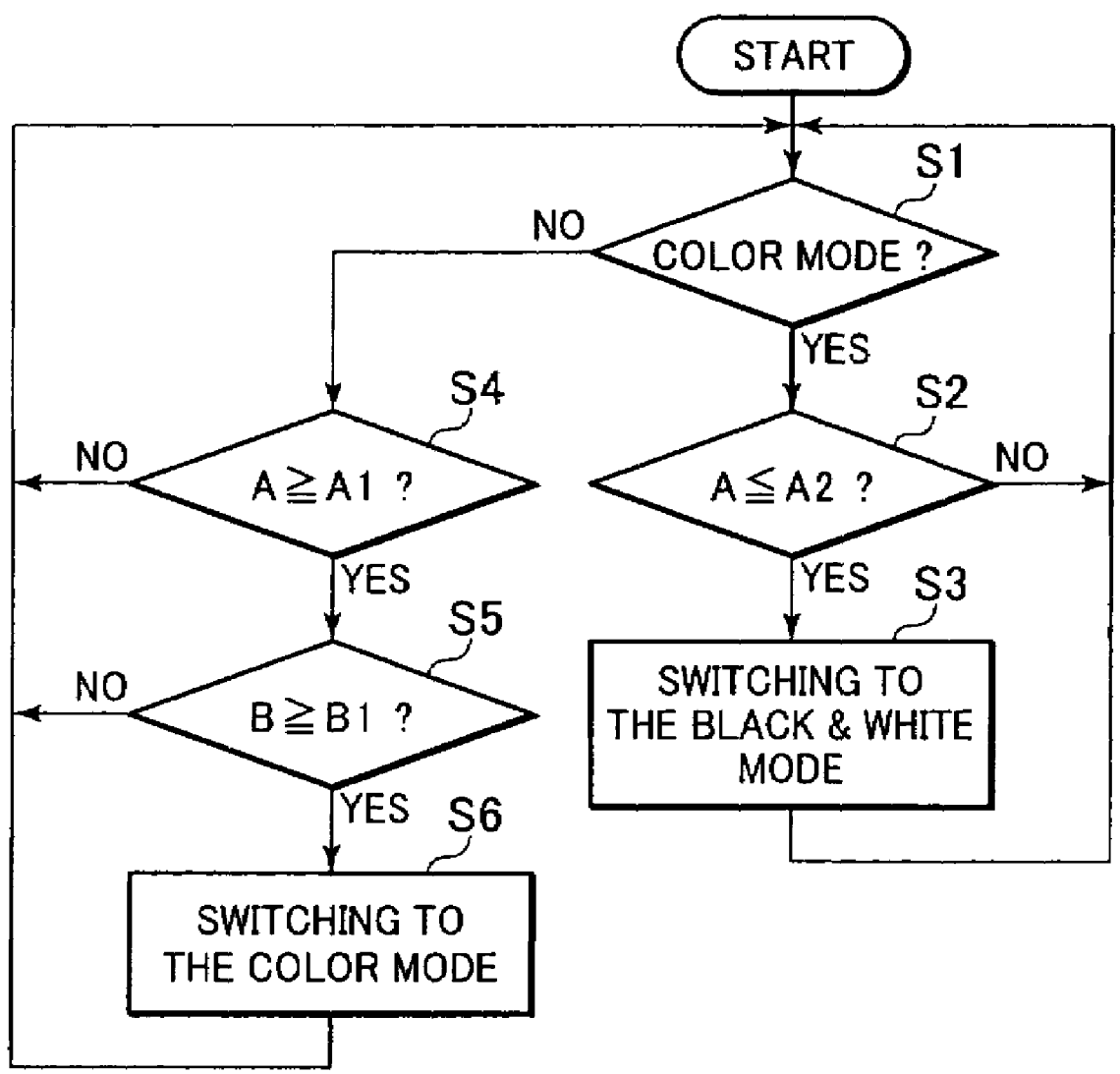

Now, a description of an operation of the controlling circuit 10, which executes switching between the color photographing mode (which can be referred to as a color mode) and the black & white photographing mode (which can be referred to as a black & white mode), will be provided hereinafter with reference to the flow chart as illustrated in FIG. 2.

In Step S1, it is determined as to whether or not the current photographing mode is the color mode. When it is determined that the current photographing mode is the color mode (i.e., "YES"), the processing proceeds to Step S2 where it is determined whether or not the luminance "A" detected by the luminance detecting section 7a of the signal processing circuit 7 is equal to or less than a threshold value "A2." At this stage, it is to be noted that the data of the threshold value "A2" can be preliminarily stored in a non-illustrated memory in the controlling circuit 10. In Step S2, when it is determined that the luminance "A" is equal to or less than the threshold value "A2", the processing proceeds to Step S3 where a filter converting mechanism 2 is driven by the motor 5 to execute conversion from the infrared cutoff filter 3 to the transparent substrate 4 in order to eventually achieve switching of the photographing mode to the black & white mode. Further, the picture signal output by the signal processing circuit 7 is switched from the color signal to the black & white signal.

In Step S1, when it is determined that the current photographing mode is the black & white mode, the processing proceeds to Step S4 where it is determined as to whether or not the luminance "A" detected by the luminance detecting section 7a of the signal processing circuit 7 is equal to or larger than a threshold value "A1." At this stage, it is to be noted that the data of the threshold value "A1" can be preliminarily stored in the non-illustrated memory in the controlling circuit 10. In Step S4, when it is determined that the luminance "A" is equal to or larger than the threshold value "A1", the processing proceeds to Step S5 where it is determined as to whether or not a luminance "B" detected by the visible light luminance detecting section 9 is equal to or larger than a threshold value "B1." At this stage, it is to be noted that the threshold value "B1" can be preliminarily stored in the non-illustrated memory in the controlling circuit 10. In Step S5, when it is determined that the luminance "B" is equal to or larger than the threshold value "B1", the processing proceeds to Step S6. Thus, in Step S6, in order to execute switching of the photographing mode to the color photographing mode, the filter-converting mechanism 2 is driven by the motor 5 to perform conversion from the transparent substrate 4 to the infrared cutoff filter 3. Then, the picture signal output by the signal processing circuit 7 is switched from the black & white signal to the color signal.

In at least one exemplary embodiment the threshold value "A1" is preliminarily set as a value larger than the threshold value "A2." When the luminance "A", detected by the luminance detecting section 7a of the signal processing circuit 7, appears between the threshold values "A1" and "A2", the processing from Step S1 to Step S2 or that from Step S1 through Step S4 is repeated.

Further, the threshold value "B1" is predetermined independently from the threshold values "A1" and "A2" depending on the performance of the image pickup element 6 and the use to which the image pickup apparatus is applied. For example, if the use of the image pickup apparatus gives preference on the color photography, the threshold value "B1" will be set as a given limitative value of luminance that allows the image pickup element 6 to barely conduct the image pickup in color.

In Step S4, when the luminance detected by the luminance detecting section 7a of the signal processing circuit 7 is equal to or larger than the threshold value "A1" (i.e., YES), the processing proceeds to Step S5 where it is determined whether or not the luminance "B" detected by the visible light luminance detecting section 9 is equal to or larger than the threshold value "B1."

It will now be understood that the switching from the color photographing mode to the black & white photographing mode takes place when the luminance "A" detected by the luminance detecting section 7a (i.e., the first luminance detecting unit) is equal to or less than the threshold value "A2." Hence, when the luminance "A" is larger than the threshold value "A2", the present color photographing mode is maintained. Further, the switching from the black & white photographing mode to the color photographing mode takes place when the luminance "A" detected by the luminance detecting section 7a (i.e., the first luminance detecting unit) is equal to or larger than the threshold value "A1", and when the luminance "B" detected by the visible light luminance detecting section 9 (i.e., the second luminance detecting unit) is equal to or larger than the threshold value "B1." Thus, when the luminance "A" is less than the threshold value "A1" or when the luminance "B" is less than the threshold value "B1", the present black & white photographing mode is maintained.

Thus, according to the described configuration of at least one exemplary embodiment, the switching of the photographing mode, namely the conversion between the infrared cutoff filter 3 and transparent substrate 4 takes place based upon at least one of the results of detection conducted by the first and second luminance detecting units. Hence, generation of hunting of the switching motion can be reduced resulting in facilitating smooth switching of photographing modes.

When the infrared cutoff filter 3 and transparent substrate 4 are interposed between the imaging lens unit 1 and image pickup element 6, the material (e.g., glass), the thickness, and surface shape (shape) of the filter 3 and transparent substrate 4 are designed so that an imaging plane of the image pickup element 6 is disposed at the position of focal point of the imaging lens unit 1 under a predetermined transmission wavelength. In at least one exemplary embodiment, the transparent substrate 4 is formed in a shape of parallel planes, and the thickness thereof is designed so that when the transparent substrate 4 is interposed in the optical path of the image pickup optical system, the image pickup element 6 is disposed at a position within the focal depth of system.

In at least one exemplary embodiment, the image pickup element 6 is disposed at a position within the focal depth of the system at the time when the infrared cutoff filter 3 is interposed on the optical path of the image pickup optical system, and is also disposed at a position within the focal depth of the system at the time when the transparent substrate (optical element) 4 is interposed on the optical path of the image pickup optical system. Hence, it is not necessary to provide any drive device for moving a focusing lens within the imaging lens unit 1, thus facilitating simplified apparatus and system.

Further, the material (e.g., glass) of the transparent substrate (the optical element) 4 can be chosen so that the band of transmission wavelengths through the transparent substrate 4 is larger than the band of the transmission wavelengths through the infrared cutoff filter 3. Thus, when the transparent substrate 4 is interposed at the time of the black & white photographing mode, it is possible to effective use the quantity of light that is incident on the imaging lens unit 1 for the image pickup.

An image pickup apparatus, according to at least one exemplary embodiment, emphasizes the sharpness of a photographied image picked up under illumination by the infrared ray. In this case, the shape or material of the transparent substrate 4 can be selected so that the position of focal point of the image pickup optical system at around the light wavelength of about 840 nm is disposed on the imaging face of the image pickup element 6 that is located within the focal depth of the image pickup optical system.

Additionally an image pickup apparatus in accordance with at least one exemplary embodiment emphasizes the sharpness of a photographed image at the time of imaging in color. In this case, the shape or material of the infrared cutoff filter 3 can be selected so that the position of focal point of the image pickup optical system at around the light wavelength of about 587 nm is disposed on the imaging face of the image pickup element 6 that is located within the focal depth of the image pickup optical system.

In accordance with the foregoing exemplary embodiments of the present invention, generation of hunting in the switching operation for switching the photographing mode can be reduced while facilitating the smooth switching of the photographing modes.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

This application claims the benefit of Japanese Unexamined Patent Publication No. 2004-358360, filed Dec. 10, 2004, which is hereby incorporated by reference herein in its entirety.

What is claimed is:

1. An image pickup apparatus configured to switch between color and black & white photographing modes, comprising:
an image pickup optical system;
an image pickup element that receives a light through the image pickup optical system and opto-electronically converts the received light;
a first luminance detecting unit that detects a luminance of a photographed object based on a signal from the image pickup element;
a second luminance detecting unit that detects the luminance of the photographed object by receiving a light without intervention of the image pickup optical system; and
a converting mechanism for interposing any one of an infrared cutoff filter and an optical element in an optical path of the image pickup optical system, the infrared cutoff filter being interposed at a time of the color photographing mode, and the optical element being interposed at a time of the black & white photographing mode,
wherein the infrared cutoff filter is exchanged with the optical element based on a detected result of the first luminance detecting unit, and the optical element is exchanged with the infrared cutoff filter based on detected results of the first and second luminance detecting units, and
wherein the image pickup element is disposed at a position located within a focal depth of the image pickup optical system whether the infrared cutoff filter or the optical element is interposed in the optical path of the image pickup optical system.

2. The image pickup apparatus according to claim 1, wherein said optical element comprises a transparent substrate, wherein the transparent substrate is in a shape of parallel flat planes.

3. The image pickup apparatus according to claim 1, wherein said second luminance detecting unit comprises a visible light sensor.

4. The image pickup apparatus according to claim 1, wherein a first bandwidth of a transmission wavelengths of the optical element contains therein a second bandwidth of a transmission wavelengths of the infrared cutoff filter, and wherein the first bandwidth is larger than the second bandwidth.

5. An image pickup apparatus configured to switch between a color and a black & white photographing modes, comprising:
an image pickup optical system;
an image pickup element that receives a light through the image pickup optical system and opto-electronically converts the received light;
a first luminance detecting unit that detects a luminance of a photographed object based on a signal from the image pickup element;
a second luminance detecting unit that detects the luminance of the photographed object by receiving a light without intervention of the image pickup optical system; and
a filter converting mechanism for interposing any one of an infrared cutoff filter and an optical element on an optical path of the image pickup optical system, the infrared cutoff filter being interposed at a time of the color photographing mode, and the optical element being interposed at a time of the black & white photographing mode,
wherein the infrared cutoff filter is exchanged with the optical element based on a detected result of the first luminance detecting unit, and the optical element is exchanged with the infrared cutoff filter based on detected results of the first and second luminance detecting units, and
wherein a shape or material of the infrared cutoff filter is set in a manner such that when the infrared cutoff filter is interposed on an optical path of the image pickup optical system, the image pickup element is disposed at a position within a focal depth of the image pickup optical system.

6. The image pickup apparatus according to claim 5, wherein said second luminance detecting unit comprises a visible light sensor.

7. The image pickup apparatus according to claim 5, wherein a first bandwidth of a transmission wavelength of said optical element contains therein a second bandwidth of a transmission wavelength of said infrared cutoff filter, and wherein the first bandwidth is larger than the second bandwidth.

8. An image pickup apparatus configured to switch between a color and a black & white photographing modes, comprising:
an image pickup optical system;
an image pickup element that receives a light through the image pickup optical system and opto-electronically converts the received light;
a first luminance detecting unit that detects a luminance of a photographed object based on a signal from the image pickup element;
a second luminance detecting unit that detects the luminance of the photographed object by receiving a light without intervention of the image pickup optical system; and
a filter converting mechanism for interposing any one of an infrared cutoff filter and an optical element on an optical path of the image pickup optical system, the infrared cutoff filter being interposed at a time of the color photographing mode, and the optical element being interposed at a time of the black & white photographing mode, wherein the infrared cutoff filter is exchanged with the optical element based on a detected result of the first luminance detecting unit, and the optical element is exchanged with the infrared cutoff filter based on detected results of the first and second luminance detecting units, and wherein a shape or material of the optical element is set in a manner such that when said optical element is interposed on an optical path of the image pickup optical system, the image pickup element is disposed at a position within a focal depth of the image pickup optical system.

9. The image pickup apparatus according to claim 8, wherein said optical element comprises a transparent substrate, wherein the transparent substrate has a shape of parallel flat planes.

10. The image pickup apparatus according to claim 8, wherein said second luminance detecting unit comprises a visible light sensor.

11. The image pickup apparatus according to claim 8, wherein a first bandwidth of a transmission wavelength of said optical element contains therein a second bandwidth of a transmission wavelength of said infrared cutoff filter, and wherein the first bandwidth is larger than the second bandwidth.

* * * * *